United States Patent
Hayes

(10) Patent No.: US 6,546,445 B1
(45) Date of Patent: Apr. 8, 2003

(54) METHOD AND SYSTEM FOR CONNECTING DUAL STORAGE INTERFACES

(75) Inventor: Stuart William Hayes, Austin, TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/482,231

(22) Filed: Jan. 13, 2000

(51) Int. Cl.[7] ............................................... G06F 13/42
(52) U.S. Cl. ....................................... 710/305; 710/306
(58) Field of Search ................................. 710/305–317

(56) References Cited

U.S. PATENT DOCUMENTS

| | | | |
|---|---|---|---|
| 5,408,699 A | | 4/1995 | Yamashita et al. ........... 455/274 |
| 5,486,657 A | | 1/1996 | Bell et al. .................... 174/261 |
| 5,577,201 A | * | 11/1996 | Chan et al. .................... 714/44 |
| 5,596,169 A | * | 1/1997 | Baker et al. .................. 174/33 |
| 5,613,074 A | * | 3/1997 | Galloway ..................... 326/30 |
| 5,649,162 A | * | 7/1997 | Klein et al. .................. 710/305 |
| 5,717,430 A | * | 2/1998 | Copland et al. .............. 341/22 |
| 5,745,795 A | | 4/1998 | Pecone et al. ............... 395/882 |
| 5,834,693 A | * | 11/1998 | Waddell et al. ........ 174/35 GC |
| 5,905,885 A | * | 5/1999 | Richter et al. ................. 710/5 |
| 5,922,062 A | | 7/1999 | Evoy ........................... 710/129 |
| 6,098,284 A | * | 8/2000 | Price ............................. 29/749 |
| 6,137,678 A | * | 10/2000 | Gebara et al. ........... 312/223.2 |
| 6,304,839 B1 | * | 10/2001 | Ho et al. ...................... 703/18 |

FOREIGN PATENT DOCUMENTS

| | | | | |
|---|---|---|---|---|
| EP | 0843263 A1 | 5/1998 | ................... | 13/38 |
| WO | WO 99/09485 | 2/1999 | | |

* cited by examiner

*Primary Examiner*—Rupal Dharia
(74) *Attorney, Agent, or Firm*—Baker Botts L.L.P.

(57) ABSTRACT

A method and system for utilizing a single motherboard connector to allow connecting to one of two storage devices having different interfaces. The motherboard of a computer system includes, either as a single circuit or as a multifunction ship, an IDE controller that is operable to interface with a storage device that uses the IDE interface. The motherboard also includes a SCSI controller that is operable to interface with a storage device that uses the SCSI interface. Both controllers are coupled to a connector on the motherboard. The connector is configured to engage a SCSI interface device. The connector is coupled to one end (63) of a cable. The cable includes a second connection point (70) that is configured to engage an IDE interface device.

18 Claims, 2 Drawing Sheets

METHOD AND SYSTEM FOR CONNECTING DUAL STORAGE INTERFACES

TECHNICAL FIELD OF THE DISCLOSURE

The present disclosure relates in general to computer systems with storage devices, and, more particularly, to a method and system for connecting dual, storage interfaces.

BACKGROUND OF THE DISCLOSURE

In personal computer systems, data is stored in many different media. There are a variety of devices capable of providing the data that is utilized by a computer's processor. There are also a variety of interfaces that are used in a computer system to communicate with a storage device. The same interface may be used by different types of devices and different interfaces may be used by the same type of device.

As an example, both a hard drive and a CD reader may contain hardware for connecting to the processor using the integrated drive electronics (IDE) interface. Devices other than hard drives may use a protocol called ATA packet interface or ATAPI to connect to an IDE interface. But another hard drive may use the small computer systems interface (SCSI) instead of IDE. Additionally, each interface may also have subcategories. For example, a SCSI hard drive can have either an 8-bit bus or a 16-bit bus, sometimes referred to as wide SCSI.

Those variations in how storage devices communicate with the other major components of a computer system are addressed in a typical system by limiting the interfaces that can be used or by providing circuitry for multiple interfaces. One computer system may only allow the use of IDE drives unless an expansion card is provided for the SCSI interface. Another computer system may provide circuitry for multiple interfaces, using precious space on the motherboard. For example, a motherboard may include both an IDE controller and a 40-pin socket in order to provide an IDE interface. The controller sends and receives signals appropriate to the IDE interface to the IDE device through the 40-pin socket. That motherboard may also include a SCSI controller connected to a 50-pin socket in order to provide a SCSI interface. Such use of motherboard space to provide both IDE and SCSI functionality may preclude other components that are desired in the computer system. Another possibility is increasing costs by increasing the size of the moterhboard and the case necessary to hold it.

Standard IDE and SCSI controllers are inexpensive in comparison to custom-built controllers. Such standard controllers may be included as portions of multifunction chips. Allocating space for both SCSI and IDE sockets on a motherboard is wasteful when only one device will be used at a time. While the size of circuitry diminishes each year, the size of a standard IDE or SCSI socket has remained the same in order to comply with the physical standard. It is desirable that a motherboard have the capability to be used with either IDE or SCSI devices without sacrificing space needed for other functionality.

SUMMARY OF THE DISCLOSURE

A method and system for connecting dual storage interfaces is disclosed that provides significant advantages over prior dual interface configurations. A computer system having the interface circuit allows flexible use of storage devices that are designed for either the IDE or SCSI interface while reducing use of motherboard space.

A computer system is provided that is capable of connecting to either an IDE or a SCSI device with a single socket or connector and without using an expansion slot. The computer system includes a motherboard with both IDE and SCSI controllers. The motherboard also includes a SCSI connector or socket. A cable is included in the computer system which can connect the SCSI socket to an IDE device. In a further enhancement, the cable may provide a third connection point for SCSI devices.

A more specific computer system is also provided in which a disconnect circuit is coupled between the IDE controller and the SCSI socket. The disconnect circuit only allows communication between the IDE controller and the SCSI socket when an IDE device has been detected.

A method is provided for connecting to multiple interfaces in which an IDE controller and a SCSI connector or socket are coupled to a motherboard. An IDE device is coupled to the SCSI connector. The electrical status of a pin of the IDE device is tested and, if it is at ground, communication is enabled between the IDE controller and the SCSI connector. A further enhancement of the method couples a SCSI controller to both the motherboard and the SCSI connector, and disables the SCSI controller when the tested pin is at ground.

It is a technical advantage of the disclosed methods and systems that both IDE and SCSI interface storage devices can communicate with other computer system components without committing motherboard space for two sockets or using an expansion slot. In this manner a computer system can retain storage device interface flexibility while reducing physical size.

Another technical advantage of the system and method disclosed is that it can utilize standard IDE and SCSI controllers. Such controllers are available both as separate integrated circuits and as part of multifunction chips. Other technical advantages of the present disclosure will be readily apparent to one skilled in the art from the following figures, descriptions, and claims.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE DISCLOSURE

Figure 1:
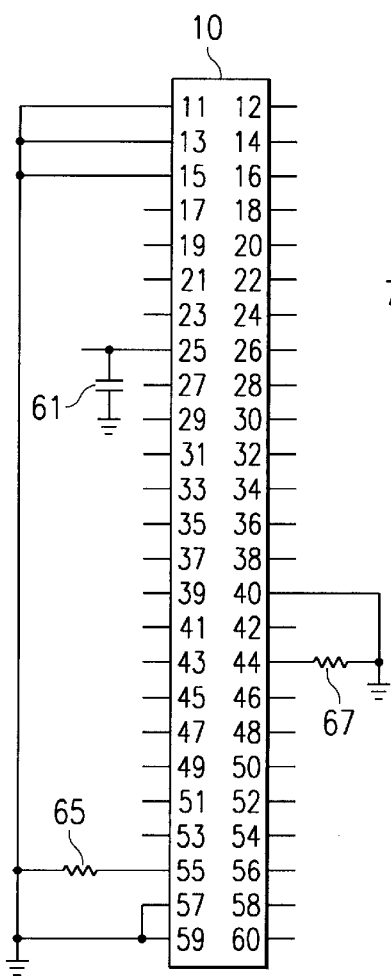
FIG. 1 is a diagram of a SCSI connector in an embodiment of the present disclosure.

FIG. 1 is a diagram of a SCSI connector 10 in an embodiment of the present disclosure. The connector 10 can also be referred to as a socket. In this embodiment the SCSI connector 10 has fifty pins numbered for reference as 11–60.

It would also be possible to employ the disclosure with any SCSI connector having 40 or more pins.

The pins on the connector 10 each represent an electrical connection point that is operable to receive and transmit electrical signals independently of the other pins. In the embodiment shown in FIG. 1, certain pins (11–16 and 57–60) are only used by the SCSI controller. Other embodiments could reserve other pins for the SCSI controller depending upon the configuration of the cable, see FIG. 2. Of the reserved pins, five 11, 13, 15, 57, 59 are grounded in the SCSI interface. They are tied to ground because they are not used by the IDE controller.

Three of the pins allocated to both the SCSI controller and the IDE controller 40, 44, 55 are tied to ground for both interfaces. Two of those pins 44, 55 are tied to ground through resistors 65, 67. The resistors 65, 67 only for testing purposes. The pins 40, 44, 45 are tied to ground either because the pin is defined as ground for that interface, or because the embodiment of FIG. 1 does not use a possible feature of an interface. For example, in another embodiment, pin 55 could be used to operate an light emitting diode (LED) indicating that an IDE device was running. That pin would still be tied to ground for the SCSI interface. As another example, pin 44 can be used to select one of a plurality of IDE devices attached to the connector 10. In one embodiment, pin 44 is connected to the IDE controller throughout the disconnect circuit, see FIG. 4. In the embodiment of FIG. 1, only a single IDE device is supported and pin 44 is connected to ground.

Pin 25 is connected to ground through a capacitor 61 to provide stability. Pin 25 provides a signal that can be used to detect whether a device attached to the connector 10 uses the IDE or the SCSI protocol. IDE devices are provided with power through a connection that is separate from the communication connection. A powered IDE device will apply a ground voltage to pin 25 when plugged into the connector 10 with one cable of the present disclosure.

Figure 2:
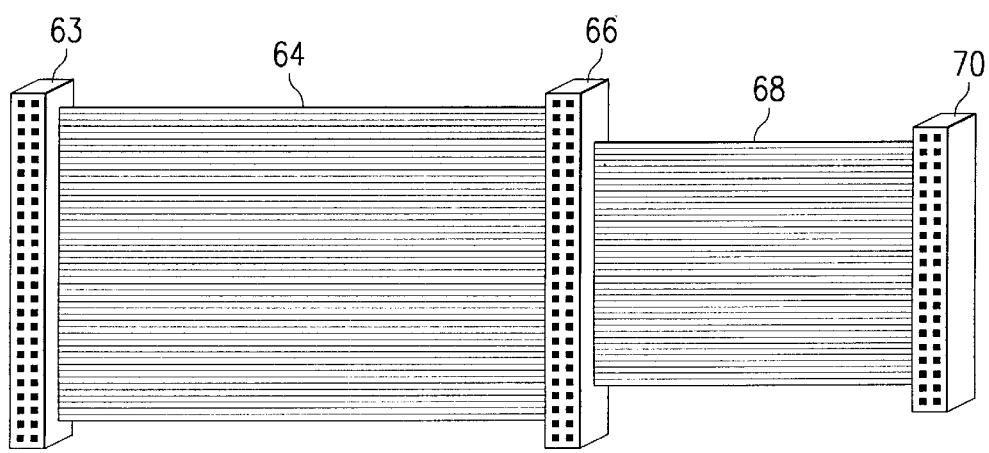
FIG. 2 is a drawing of a cable for use in a computer system of the present disclosure.

FIG. 2 is a drawing of a cable 62 for use in a computer system of the present disclosure.. A first connection point 63 on the cable 62 is operable to engage the SCSI socket 10 so that the first set of signal lines 64 are each in electrical communication with the pins 11–60. In this embodiment there are fifty signal lines in the first set 64.

A second connection point 70 is connected to a second set of signal lines 68. There are forty signal lines in the second set of signal lines 68. The second connection point is operable to engage an IDE device. When an IDE device is connected, it can communicate with forty of the pins 17–56. An alternate embodiment could connect the IDE device with a different subset of forty pins on the SCSI connector 10 by rearranging the second set of signal lines 68. The corresponding circuitry attached to the connector 10, see FIGS. 1 and 3–5, could be modified to match the new pin arrangement.

A third connection point 66 may be included in the cable 62 so that a SCSI device can communicate electrically with all fifty pins 11–60. The third connection point allows the computer system to switch between communicating with an IDE device and communicating with a SCSI device without disconnecting the cable 62 from the connector 10.

In an alternative embodiment only two connection points 63, 70 are provided on the cable 62. To connect a SCSI device, the cable 62 is removed from the socket 10 and the SCSI device is plugged directly into the socket 10. In that alternate embodiment, the cable can include only the forty signal lines of the second set 68 and the first connection could be operable to engage the SCSI socket 10 so that the second set of signal lines 68 are each in electrical communication with the pins 17–56.

Figure 3:
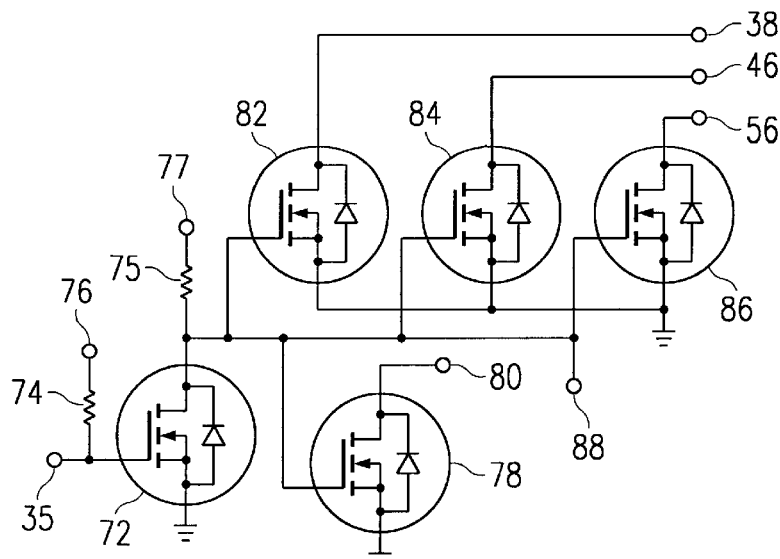
FIG. 3 is a diagram of a circuit for detecting the interface of a storage device in accordance with an embodiment of the present disclosure.

FIG. 3 is a diagram of a circuit for detecting the interface of a storage device in accordance with an embodiment of the present disclosure. Pin 35 is connected to the gate of a transistor 72. Pin 35 is also connected to a five volt voltage source 76 through a resistor 74. The resistor 74 can have a resistance value of 8.2 kohms. The source of the transistor is also connected to a five volt voltage source 77 through a resistor 75. Resistor 75 can also be a 8.2 kohm resistor. The drain of the transistor is connected to ground.

When pin 35 is grounded by connection to an IDE device, current flows through resistor 74 maintaining the different voltages. Because the gate of transistor 72 is at ground, the transistor 72 is in the off state and presents a high resistance between its source and drain.

The resistance of resistor 75 is small compared with the resistance of the transistor 72 in the off state, therefore most of the voltage falls across the transistor 72, rather than across the resistor 75. Thus voltage 88 is very close to the five volt value of voltage 77 when an IDE device is attached to the connector.

If a SCSI device is attached to the connector 10, pin 35 will present a high impedance rather than ground. Little of the voltage 76 will fall across resistor 74 and the gate of the transistor 72 have a voltage very close to the five volts of voltage source 76. That voltage on the gate will put the transistor 72 in the on state so that the resistance between the source and drain is small. When the transistor resistance is small, most of the five volts difference between the voltage source 77 and ground falls across resistor 75. Thus, voltage 88 will be very close to ground when a SCSI device is attached to the connector 10.

The above described behavior of voltage 88 is described by labeling voltage 88 as IDE_PRESENT because it is low when an IDE device is not attached and high when an IDE device is attached. For the same reason pin can be labeled as SCSI_PRESENT. In an embodiment of the present disclosure, the IDE_PRESENT 88 and SCSI_PRESENT 35 signals are used to connect and disconnect the IDE and SCSI controllers from the connector 10.

When IDE_PRESENT 88 is high, transistor 78 is on and voltage 80 is low. When IDE_PRESENT 88 is low, transistor 78 is off and voltage 80 is high impedance. Thus, voltage 80 provides a signal equivalent to SCSI_PRESENT 35 without allowing direct manipulation of the SCSI_PRESENT pin 35. For the same reasons each of pins 38, 46, and 56 are grounded by low transistor 82, 84, 86 resistance when an IDE device is attached to the socket 10, and otherwise connected to a high impedance. This outcome accords with the IDE interface, which specifies that those pins are grounded, while allowing them to be controlled by the SCSI controller when a SCSI device is attached.

Figure 4:
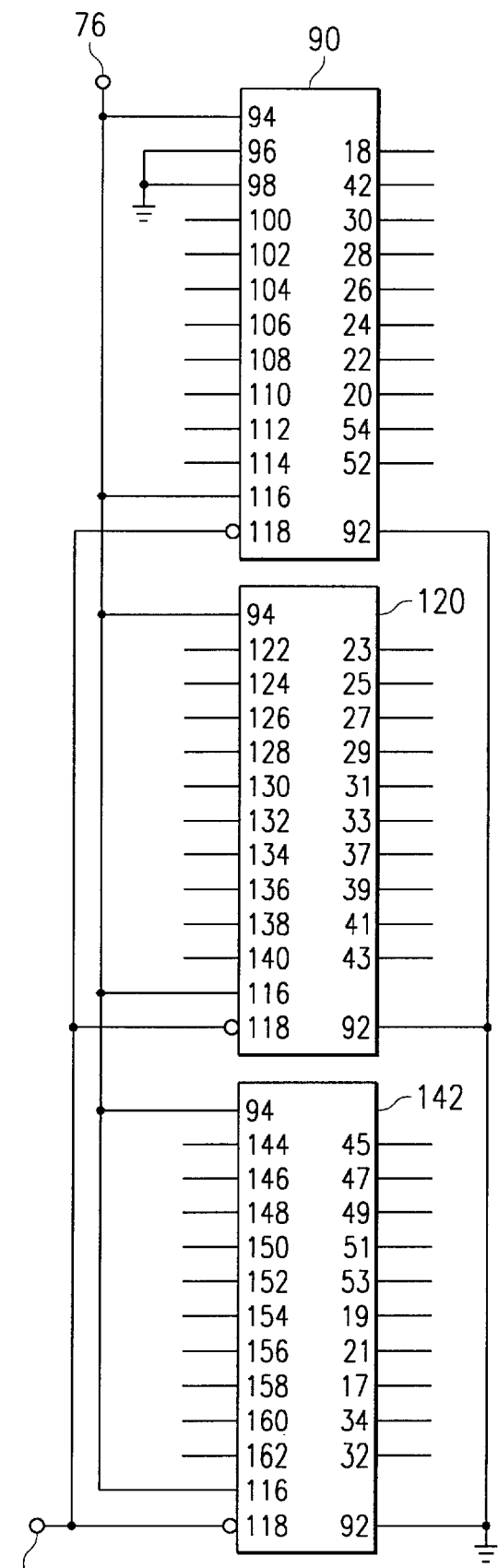
FIG. 4 is a disconnect circuit for controlling access to the SCSI connector in accordance with an embodiment of the present disclosure.

FIG. 4 is a disconnect circuit for controlling access to the SCSI connector in accordance with an embodiment of the present disclosure. The disconnect circuit includes three FET switches 90, 120, 142, also called quickswitches. In one embodiment FET switches made by Fairchild, product number FSTU6800QSC, and Pericom, product number P15C6801CQ, could be used. The FET switches 90, 120, 142 are connected to a five volt voltage 76 at pins 94 and 116. Each FET switch is also connected to ground at pin 92. The FET switches have a low enable input 118. The connections on one side of the FET switches are coupled to pins of the SCSI connector 10. The other side of the FET switches has connections 100–114, 122–140, and 144–162 that are coupled to an IDE controller. In one embodiment the IDE controller is a portion of a multifunction chip, product number RCC OSB4, made by Reliance Computer Company.

The FET switches 90, 120, 142 operate to allow communications between the connections on their different sides when a ground voltage is received at the low enable inputs 118. Because the SCSI_PRESENT signal 35 is coupled to the low enable inputs 118, the FET switches allow communication when an IDE device is attached to the SCSI connector 10 and is forcing pin 35 to ground. In one embodiment pins 18 and 42 are grounded in the IDE interface but are used by the SCSI controller in the SCSI interface. The left side connections which correspond to pins 18 and 42 are tied to ground so that an IDE device will see grounded pins When a SCSI device is attached to the connector or no device is attached, the FET switches 90, 120, 142 are not enabled. The nonenabled FET switches 90, 120, 142 leave the connector pins in a high impedance state, not controlled by the IDE controller. The high impedance state does not inhibit signals placed on the pins by the SCSI controller.

Figure 5:
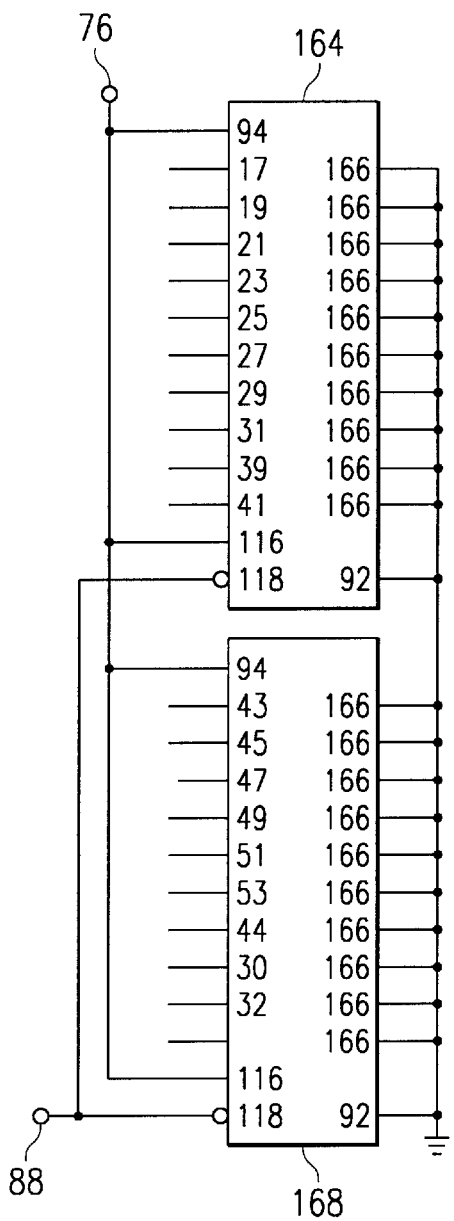
FIG. 5 is a circuit for selectively grounding pins of the SCSI connector in accordance with an embodiment of the present disclosure.

FIG. 5 is a circuit for selectively grounding pins of the SCSI connector in accordance with an embodiment of the present disclosure. In one embodiment of the disclosure the SCSI controller is an Adaptec 7880 used as a narrow SCSI controller. A SCSI controller can have a disable feature that is attached to voltage 80. When voltage 80, an equivalent to the SCSI_PRESENT signal 35, is low, the SCSI controller is disabled and leaves the connector pins 11–60 to which it is attached at high impedance. The high impedance state allows the IDE controller to communicate using the pins.

In an alternate embodiment where the SCSI controller does not have the disable feature, a disconnect circuit, like the IDE disconnect circuit of FIG. 4, could be provided between the SCSI controller and the SCSI connector 10 to only allow communication when IDE_PRESENT is low. In another alternate embodiment the IDE controller being used in the computer system includes a disable input. In that embodiment the disconnect circuit of FIG. 4 is unnecessary and the IDE controller could be disabled when an IDE device was not attached. Even in that embodiment, pins 18 and 42 would still need to be connected to ground through a much smaller disconnect circuit.

In the embodiment of FIG. 5, the SCSI interface requires that several pins that are used by the IDE controller be connected to ground when a SCSI device is attached. The circuit includes two FET switches 164,168 that have connections 94, 116 to a five volt source 76 and connections 92 to ground. All of the connections 166 on one side of the FET switches 164, 168 are tied to ground. The connections on the other side are coupled to pins of the SCSI socket 10. The low enable input 118 of the FET switches 164,168 is connected to the IDE_PRESENT signal 88.

The FET switches 164,168 operate to ground the pins except when an IDE device is attached to the SCSI socket 10. In that case, the pins are left in a high impedance state that allows the IDE controller to communicate on those signal lines. The combination of the disconnect circuit of FIG. 4, the grounding circuit of FIG. 5, and the disable function of the SCSI controller enables the SCSI socket to receive only those signals appropriate to control the interface of the device that is attached to the socket.

Although the present disclosure has been described in detail, it should be understood that various changes, substitutions and alterations can be made thereto without departing from the spirit and scope of the invention as defined by the appended claims.

What is claimed is:

1. A computer system, comprising:
   a motherboard, the motherboard including:
      an IDE controller;
      a SCSI controller;
      a SCSI connector coupled to both controllers; and
      a detection circuit for determining whether a IDE device or a SCSI device is coupled to the SCSI connector, wherein the IDE controller is active when the IDE device is detected and the SCSI controller is active when the SCSI device is detected.

2. A computer system, comprising:
   a motherboard, the motherboard including:
      an IDE controller;
      a SCSI controller; and
      a SCSI connector coupled to both controllers;
      a cable having at least first and second connection points, the first connection point operable to engage the SCSI connector, the second connection point operable to engage an IDE device; and
      a storage interface detection circuit coupled through the SCSI connector to a first signal path of the cable, wherein the storage interface detection circuit detects the storage interface from the state of the first signal path.

3. The computer system of claim 2, wherein the SCSI connector is a 50-pin connector.

4. The computer system of claim 2, wherein the IDE device has a 40-pin connector, the second connection point comprises a 40-pin connector, and a portion of the cable proximate the second connection point consists of 40 signal paths.

5. The computer system of claim 2, wherein a ground state of the first signal path indicates that an IDE storage device is connected to the cable.

6. The computer system of claim 5, further comprising a disconnect circuit coupled between the IDE controller and the SCSI connector, wherein the disconnect circuit is operable to disable communication between the IDE controller and the SCSI connector in response to a signal generated by the storage interface detection circuit.

7. The computer system of claim 2, wherein the cable includes a third connection point operable to engage a SCSI device.

8. The computer system of claim 2, wherein the first connection point is operable to disengage the SCSI connector.

9. The computer system of claim 2, wherein the IDE controller is a multifunction chip.

10. A method for connecting dual storage interfaces to respective devices through a common connector, comprising the steps of:
   coupling an IDE controller to a motherboard;
   coupling a SCSI controller to the motherboard;
   coupling a SCSI connector to the IDE controller and the SCSI controller; and
   testing whether an IDE device or a SCSI device is coupled to the SCSI connector, wherein the IDE controller is active when the IDE device is detected and the SCSI controller is active when the SCSI device is detected.

11. A method for connecting dual storage interfaces, comprising the steps of:
   coupling a SCSI controller to a motherboard;
   coupling a SCSI connector to the motherboard;

coupling the SCSI controller to the SCSI connector;
coupling an IDE controller to the motherboard;
connecting an IDE device to the SCSI connector;
testing a pin of the IDE device;
disabling the SCSI controller when the pin of the IDE device is at ground; and
enabling communication between the SCSI connector and the IDE controller when the pin of the IDE device is at ground.

12. The method for connecting dual storage interfaces of claim 11, wherein the step of enabling communication between the SCSI connector and the IDE controller further comprises the step of:

connecting a first side of at least one switching circuit to pins of the SCSI connector;
connecting a second side of the at least one switching circuit to pins of the IDE controller; and
enabling the at least one switching circuit when the pin of the IDE device is at ground.

13. The method for connecting dual storage interfaces of claim 11, wherein the SCSI connector comprises a 50-pin SCSI connector.

14. The method for connecting dual storage interfaces of claim 13, wherein the step of connecting the IDE device to the SCSI connector comprises connecting the IDE device to 40 pins of the SCSI connector.

15. The method for connecting dual storage interfaces of claim 11, wherein the step of testing the pin comprises, coupling the pin to the gate of a transistor;
coupling the pin to a high voltage through a resistor;
coupling the drain of the transistor to a low voltage;
coupling the source of the transistor to a high voltage though a resister; and
receiving the voltage found at the source of the transistor.

16. A method for connecting dual storage interfaces, comprising the steps of:

coupling an IDE controller to a motherboard;
coupling a SCSI controller to the motherboard;
coupling a SCSI connector on the motherboard to the IDE and SCSI controllers;
coupling a first connection point of a cable to the SCSI connector;
attaching a second connection point operable to engage an IDE device to the cable;
coupling a storage interface detection circuit to the SCSI connector;
coupling a SCSI interface storage device to the SCSI connector;
detecting the SCSI interface storage device with the storage interface detection circuit; and
disabling communication between the IDE controller and the SCSI connector.

17. The method for connecting dual storage interfaces of claim 16, further comprising the step of:

coupling a plurality of the SCSI connector pins to ground.

18. A method for connecting dual storage interfaces, comprising the steps of:

coupling an IDE controller to a motherboard;
coupling a SCSI controller to the motherboard;
coupling a SCSI connector on the motherboard to the IDE and SCSI controllers;
coupling a first connection point of a cable to the SCSI connection;
attaching a second connection point operable to engage an IDE device to the cable;
coupling a storage interface detection circuit to the SCSI connector;
coupling an IDE interface storage device to the SCSI connector;
detecting the IDE interface storage device with the storage interface detection circuit; and
enabling communication between the IDE controller and the SCSI connector.

* * * * *